Figure 1:
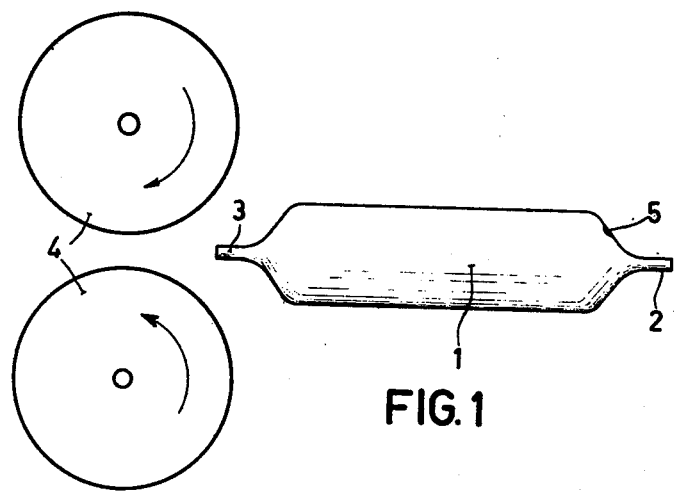

April 9, 1963 G. DIEMER ETAL 3,084,397
METHOD OF MANUFACTURING LAYERS CONSISTING OF CHALCOGENIDES
Filed June 1, 1960

INVENTOR
GESINUS DIEMER
WILLEM VAN GOOL
BY
AGENT 3,084,397
METHOD OF MANUFACTURING LAYERS CONSISTING OF CHALCOGENIDES
Gesinus Diemer and Willem Van Gool, Eindhoven, Netherlands, assignors to North American Philips Company, Inc., New York, N.Y., a corporation of Delaware
Filed June 1, 1960, Ser. No. 33,139
Claims priority, application Netherlands June 4, 1959
4 Claims. (Cl. 18—59.3)

This invention relates to methods of manufacturing coherent layers on the basis of chalcogenides, that is to say sulphides, selenides and/or tellurides, of elements of the second sub-group of the periodic table, that is to say, zinc, cadmium and/or mercury. Such chalcogenides and their mixed crystals are used as photo-conductive or luminescent materials and this preferably in the form of layers. If desired, impurities may be added to these materials to either make them suitable for these uses or to improve their properties in view of these uses. However, the above-mentioned materials are very brittle and can therefore be worked only with difficulty into coherent layers. In addition, these materials dissociate already to a considerable extent below their melting point, so that it is difficult to form them in the desired shape with the use of a melting treatment.

It has previously been suggested to manufacture layers on the basis of cadmium sulphide by compressing and subsequently sintering cadmium sulphide in the pulverulent or granular state. Thin layers having a satisfactory coherence and a high space factor could thus be obtained. The space factor of a material is to be understood to mean herein the ratio between the density of the material and the density of a single crystal of the material expressed in percent. However, such good coherence was obtained only after sintering. The pressing process is not particularly suitable for manufacturing layers of comparatively large dimensions. In addition, the pressed layer is very brittle prior to sintering and thin layers of comparatively large dimensions can therefore be handled only with difficulty, while in the case of small dimensions the layers are also required to be comparatively thick, that is to say at least 500 microns.

The invention relates, among other things, to a method of manufacturing layers of the above-mentioned materials, in which these disadvantages do not occur. A further object of the invention is to permit the manufacture of such coherent layers of comparatively large surface area.

According to the invention, a basic material consisting at least substantially of one or more of these chalcogenides and/or mixed crystals thereof is rolled. Since, during rolling, pressure is momentarily exerted upon a narrow strip, a high pressure may readily be obtained by rolling over a comparatively broad front and this front may be displaced over an unlimited distance with respect to the material to be rolled so that layers of considerable rigidity and comparatively large dimensions may be obtained by rolling despite the brittleness of the basic material. The dimensions are substantially limited by the amount of material which has been rolled in relation to the thickness of the layer. So layers with thicknesses less than 500μ and surfaces of about 60 cm.² have been prepared without any indication that preparation of layers of larger dimensions should be impossible. The material will flow during this process to an extent such that a high space factor can be obtained. Thus, when using cadmium sulphide as the basic material, a space factor above 90% may readily be obtained. The method according to the invention also permits of manufacturing very thin coherent layers, that is to say, layers of thicknesses less than 500 microns, for example, thicknesses of at most 100 microns, such layers are thin enough to be used as self-supporting layers for optical filters and also sufficiently dense and rigid to be used as optical windows without these layers requiring to be sintered after rolling. True, for certain uses, for example in photo-electric cells or in image intensifiers having photo-sensitive layers consisting of cadmium sulphide, it will be desirable to improve the crystalline structure by means of after-heating for instance at temperatures ranging from 500 to 800 degrees Celsius, but such a treatment is not necessary for improving the coherence and the temperature need not be so high that the material is sintered, i.e. 850–950° C.

In one preferred embodiment, the basic material during rolling is separated from the rollers employed by means of at least one metal part, which is preferably of a comparatively hard metal, such as steel. Thus, the basic material may be rolled between two metal plates. A flat layers of a highly uniform thickness may thus be obtained. In order to prevent the layer from adhering to the metal part, an organic fibrous material, such as paper, is preferably interposed between the metal part and the basic material. The residues of this substance may readily be removed from the resulting layer by burning.

The metal part preferably has the shape of a metal tube closed at each end and into which the basic material has been introduced. This tube is rolled flat, during which process the basic material cannot be pressed away so that loss of material cannot occur and the space factor of the constitutive material of the layer is increased.

Figure 2:
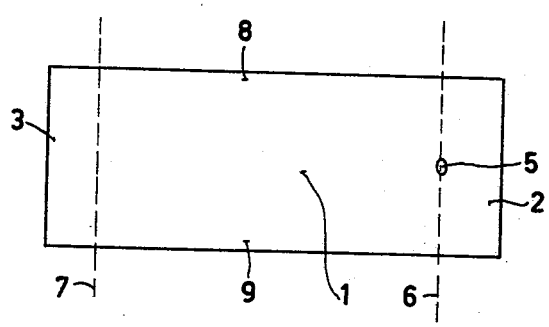

In order that the invention may be readily carried into effect, one embodiment thereof will now be described in detail, by way of example, with reference to the accompanying diagrammatic drawing, in which:

FIGURE 1 is a side view of a tube pinched shut at each end and filled with the basic material prior to rolling, and FIGURE 2 is a plan view of the same tube after rolling.

*Example*

A block of cadmium sulphide obtained by pressing powder and having a length of 28 mms., a width of 15 mms. and a thickness of 3 mms., is previously packed in pure cellulose paper, for example, filter paper. The block is then introduced into a vanadium steel tube 1 as shown in FIGURE 1, having a length of 10 cms., an inner diameter of 19 mms. and an outer diameter of 22 mms. This tube is pinched shut at its ends 2 and 3. The tube containing the block of cadmium sulphide is subsequently rolled between two rollers 4 with a deformation of 30% at a temperature of 200° C., starting at the end 3 and terminating at the end 2. The temperature used during rolling is not critical. Rolling at room temperature or higher temperatures till about 300° C. may also be used. This treatment is repeated several times whereby the tube is pressed flat and the cadmium sulphide is rolled out between the flattened parts of the tube, the material thus starting to flow and producing a rigid layer. The air present in the tube can escape through an aperture 5 previously provided in the wall of the tube near the end 2. The flattened tube obtained is shown in FIGURE 2 and has been rolled to a total thickness of 2 mms. Its ends 2 and 3 are cut off along the dotted lines 6 and 7 respectively, the folding edges 8 and 9 resulting from the flattening of the tube being ground off, whereupon the two remaining rolled steel plates are separated and the resultant layer of cadmium sulphide is taken out. The residues of the paper fibres may then readily be removed by burning. The layer has a thickness of 200 microns, a length of about 9 cm. and a width of about 3.5 cm. and did not break by careful handling. If a thinner layer is desired, a small piece of the layer having a length of about 20 mms. and a width of 15 mms. may be introduced in a corresponding manner into a similar steel tube, whereupon the thickness of the layer is decreased further by rolling to 50 microns. The layer obtained in the last-mentioned manner having a surface area of about 12 cm.$^2$ is rigid enough to be handled and may serve as an optical filter or window. For use in photoelectric cells or image intensifiers, the layer is preferably after-heated at temperatures between 500° C. or 600° C. during a few hours in an inert H$_2$S-containing atmosphere, resulting in an increase in photo-sensitivity.

What is claimed is:

1. A method of manufacturing a thin, coherent, rigid, plate-like body of the order of 500 microns or less in thickness and of large surface area principally composed of a chalcogenide of a metal selected from the group consisting of zinc, cadmium, and mercury, and exhibiting the properties of high brittleness and a tendency to dissociate at elevated temperatures below its melting point, comprising providing a larger body of said chalcogenide material in pulverulent form between metal members and interposing a layer of removable material between the chalcogenide material and the metal members to prevent adhesion therebetween, then subjecting said metal sandwiched chalcogenide body to a rolling operation below a temperature of about 850° C. causing a material reduction in its thickness to the required value, and thereafter removing the metal members and layer of removable material from the body without subjecting the body to an elevated temperature above its dissociation temperature leaving a rigid, self-supporting, plate-like, dense chalcogenide body of the required thickness.

2. A method as set forth in claim 1 wherein the layer of removable material is an organic fibrous material, and the metal members are of steel.

3. A method as set forth in claim 2 wherein the chalcogenide is principally cadmium sulfide.

4. A method of manufacturing a thin, coherent, rigid, plate-like body of the order of 500 microns or less in thickness and of large surface area principally composed of a chalcogenide of a metal selected from the group consisting of zinc, cadmium, and mercury, and exhibiting the properties of high brittleness and a tendency to dissociate at elevated temperatures below its melting point, comprising providing a larger body of said chalcogenide material in pulverulent form in a metal tube substantially closed at opposite ends and interposing a layer of removable material between the chalcogenide material and the metal tube to prevent adhesion therebetween, then subjecting said metal enclosed chalcogenide body to a rolling operation below a temperature of about 850° C. causing a material reduction in its thickness to the required value, and thereafter removing the metal tube and layer of removable material from the body without subjecting the body to an elevated temperature above its dissociation temperature leaving a rigid, self-supporting, plate-like, dense chalcogenide body of the required thickness.

References Cited in the file of this patent

UNITED STATES PATENTS

| | | |
|---|---|---|
| 930,723 | Bolton et al. | Aug. 10, 1909 |
| 1,371,924 | Moore | Mar. 15, 1921 |
| 1,406,542 | Crocker | Feb. 14, 1922 |
| 2,333,271 | Patterson | Nov. 2, 1943 |
| 2,616,232 | Meyer | Nov. 4, 1952 |
| 2,651,700 | Gans | Sept. 8, 1953 |
| 2,717,423 | Uhlig et al. | Sept. 13, 1955 |
| 2,756,492 | Pettibone | July 31, 1956 |
| 2,790,999 | Peck et al. | May 7, 1957 |
| 2,843,914 | Koury | July 22, 1958 |
| 2,888,740 | Danis | June 2, 1959 |